Figure 1:
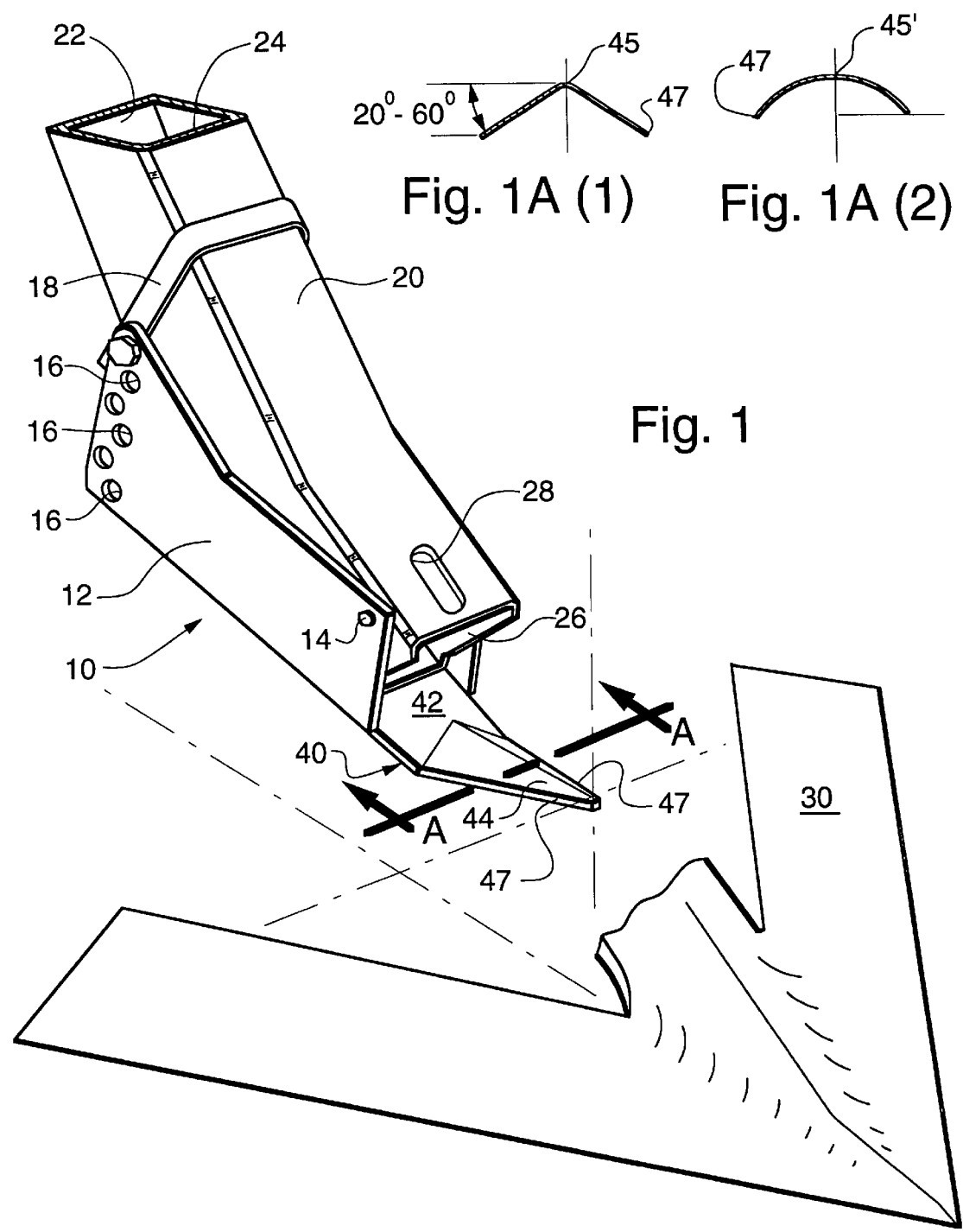
Figure 2:
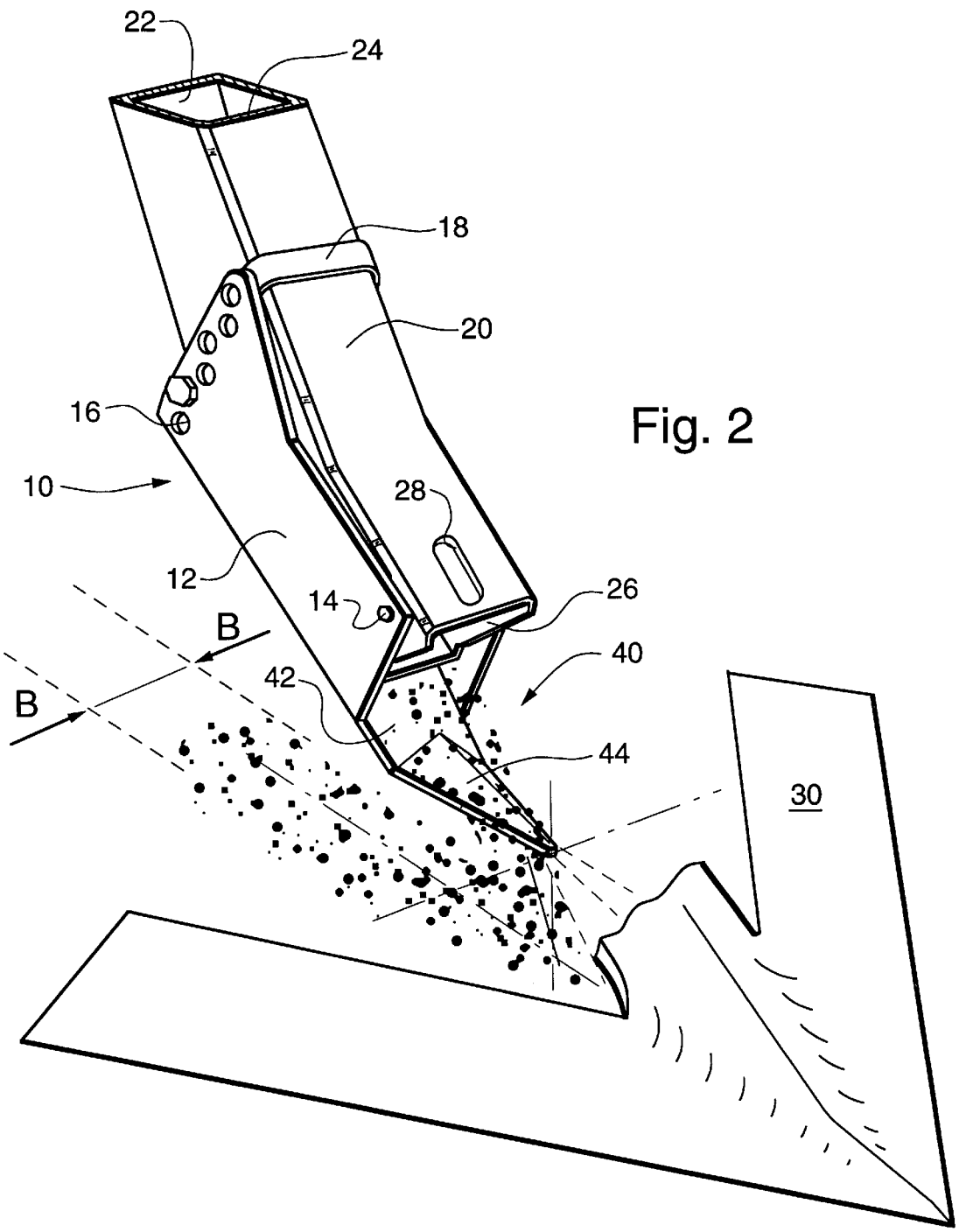

United States Patent
Swab et al.

[11] Patent Number: 5,983,813
[45] Date of Patent: Nov. 16, 1999

[54] SEEDING MATERIAL SPREADER AND OPTIONAL ADJUSTMENT MEANS

[75] Inventors: Gerry S. Swab, Rosthern; James W. Henry; Murray H. Wood, both of Saskatoon, all of Canada

[73] Assignee: Flexi-Coil Ltd, Saskatoon, Canada

[21] Appl. No.: 08/964,211

[22] Filed: Nov. 5, 1997

[51] Int. Cl.$^6$ .................................................. A01C 5/00
[52] U.S. Cl. ........................ 111/150; 111/152; 111/133
[58] Field of Search .................................... 111/150, 130, 111/149, 133, 8, 118, 119, 124, 7.4, 14, 34, 152; 172/724, 726

[56] References Cited

U.S. PATENT DOCUMENTS

| | | | |
|---|---|---|---|
| 242,862 | 6/1881 | Bartholomew et al. | 111/150 |
| 1,691,466 | 11/1928 | Burtner | 111/150 |
| 1,908,255 | 5/1933 | Kaupke | 111/150 X |
| 1,921,886 | 8/1933 | Kriegbaum et al. | 111/150 X |
| 3,188,989 | 6/1965 | Johnston | 111/150 X |
| 3,228,363 | 1/1966 | Gardner et al. | 111/150 X |
| 3,303,801 | 2/1967 | Reynolds | 111/150 |
| 4,276,836 | 7/1981 | Pust | 111/150 |
| 4,372,229 | 2/1983 | Henthorn | 111/150 |
| 4,373,455 | 2/1983 | Friggstad | 111/150 |
| 4,446,801 | 5/1984 | Machnee et al. | 111/150 X |
| 4,726,304 | 2/1988 | Dreyer et al. | 111/150 X |
| 4,911,090 | 3/1990 | Schimke | 111/150 |

FOREIGN PATENT DOCUMENTS

| | | | |
|---|---|---|---|
| 569851 | 6/1945 | United Kingdom | 111/150 |
| 1342442 | 10/1987 | United Kingdom | 111/150 |

OTHER PUBLICATIONS

Partial Spread Ribbon Flexi–Coil Product Book, vol. 2, p. 48.
JR Welding & Manufacturing Brochure—1 page.
Concord Brochure—1 page.
Farm Land Brochure—1 page.

*Primary Examiner*—Victor Batson
*Attorney, Agent, or Firm*—B. Franklin Griffin, Jr.; Larry W. Miller

[57] ABSTRACT

The invention relates to a spreader for use on a delivery tube of a seeding tool. The spreader is mounted for adjustable positioning in the product stream providing a selectable width of product scatter. The invention preferably includes a tapered deflecting surface with a convex laterally angled surfaces for achieving an even scatter pattern, especially over the varying scatter widths. The deflecting surface is pivoted or advanced into the product stream to change the breadth of surface struck by the product as a result causing different scatter patterns. In a preferred embodiment the spreader includes a channel for mounting onto the delivery tube with a pivot pin pivotally securing it adjacent the outlet and selectively adjustable securing points for angular adjustment. The spreading deflecting surface is separated from the outlet in the direction of product stream so that deflected product is not shielded by the delivery tube. A forwardly facing leading edge of a tapered spreading surface is directed into the product stream preferably between 15–30 degrees to the stream at approximately 65 degrees to the horizontal to deflect product forwardly and laterally in an even pattern.

24 Claims, 5 Drawing Sheets

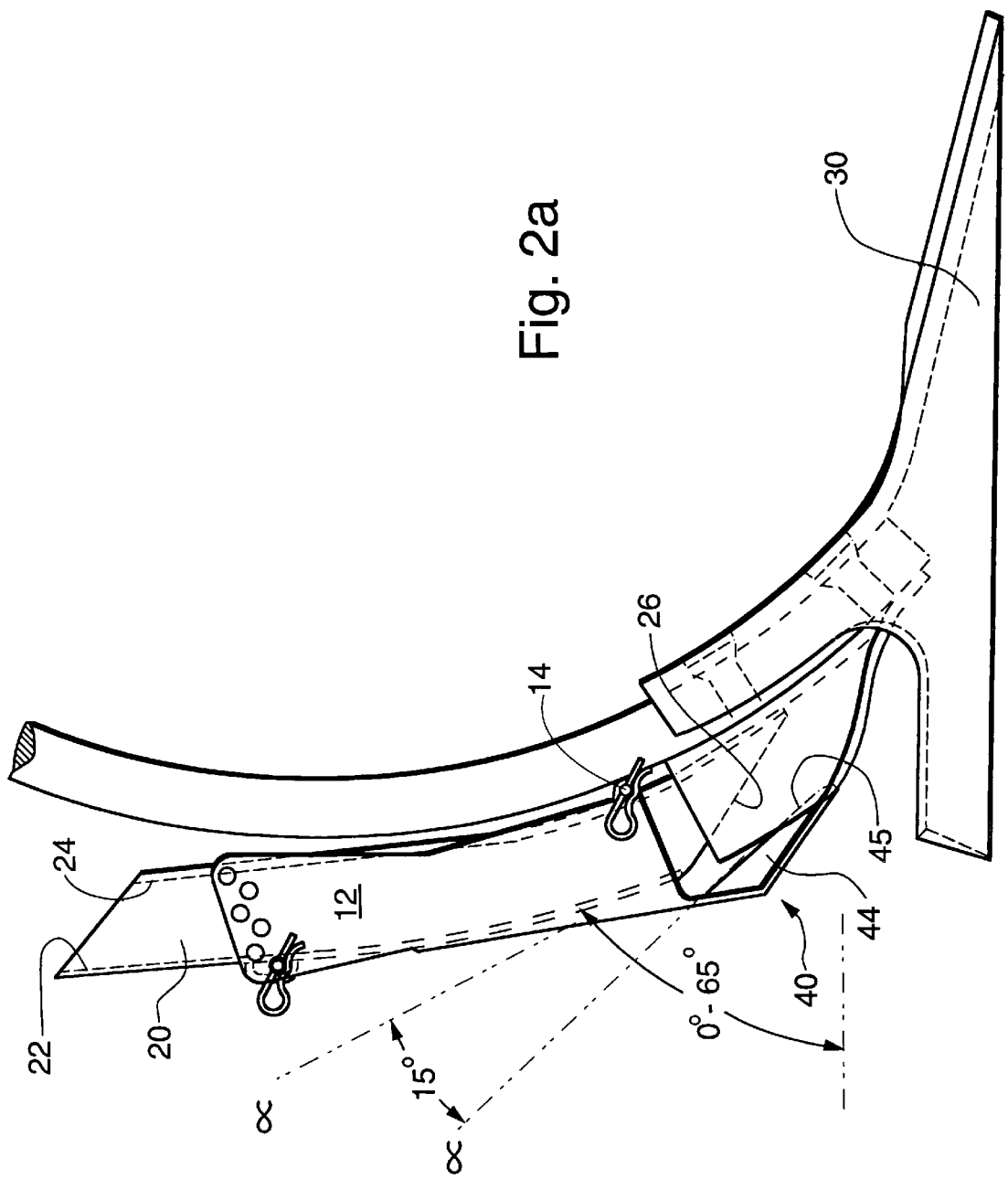

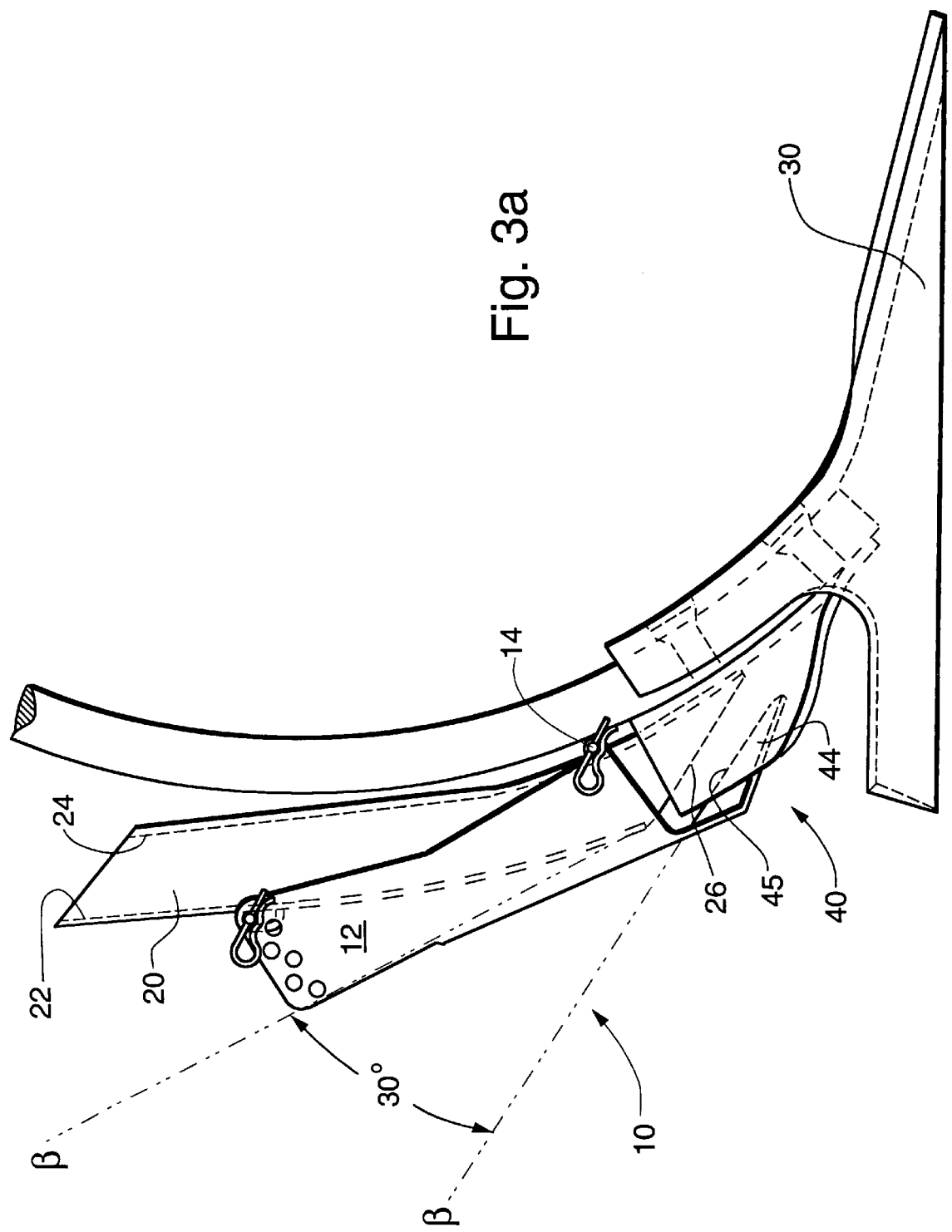

SEEDING MATERIAL SPREADER AND OPTIONAL ADJUSTMENT MEANS

FIELD OF THE INVENTION

This invention relates to a spreader for use with sowing implements particularly for providing an evenly spread delivery of seed and other products over an adjustable furrow width.

BACKGROUND OF THE INVENTION

A spreader is a scattering attachment used with planting tools such as air drills which distribute seed, fertilizer or other granular material in airflow conduits across the width of the planting tool. The spreader is associated with delivery tube, positioned either at the outlet or just inside or outside the outlet. Its purpose is to deflect and redirect seed into a broader area than the row which would be produced by the delivery tube alone. The greater the spread and uniformity of seed placement within the planting furrow, the better seed bed utilization achieved.

Seed delivery spreaders currently in use generally comprise an obstruction in or near the outlet of a seed delivery tube which divides the delivery stream into two separated streams. The spreader may be a block with angled faces, or simply a bolt protruding into the seed stream.

An example of a common type of spreader is a Standard spreader produced by Concord which includes a casting having two angled upper surfaces which meet at a central line positioned in the product stream inside the delivery tube. The casting is bolted to the front interior surface of the delivery tube, generally above the product stream. The common feature to this and equivalent designs is an obstruction essentially perpendicular or at a high angle to the travel of the product stream against which the seeds and other products collide at significant velocity. The seeds tend to separate into two separate streams about the obstruction, and are placed in the furrow essentially in two separate rows. Further, the force of the collision with the spreader causes fracturing and splitting of an undesirably large percentage of the seed.

Depending on soil conditions and other parameters, different ground opening tools will be used which create furrows of different widths. A spreader produced by Farm-Land includes replaceable castings of different widths to place in the delivery tube on the front interior surface. Different casting shapes determine the amount of separation resulting between the seeded rows. The casting has angled faces acting on the product stream which divide the seeds into two separate streams. The planting pattern is not scattered but is still divided to form separate rows. Growth patterns using this system exhibit this uneven seeding pattern. While this design achieves variation in the delivery pattern, a different tool must be obtained and installed each time a different spread width is desired to make the change. Further, the seeds still must collide with a nearly perpendicular obstruction surface and will suffer damage.

A Flexi-Coil design provides a spreader formed integrally on the rear interior surface of the delivery tube adjacent the outlet. The deflector has a rounded convex shape and does not present the perpendicular surface to the seed stream. However, this design is only suitable for producing a narrow seed scatter pattern since it is within the delivery tube, and the product spread is not as even as desired.

A design from JR Welding discloses the use of a rectangular extension surface extending from the rear interior surface of the delivery tube behind the product stream. The spreader is crimped to conform to the outlet and to have a high central ridge from which the surfaces are angled laterally. The spreader is welded onto the outlet at a small angle to the product stream compared to other prior art devices. The gentle angle of this spreader to the product stream does cause less shock damage to the seed than other spreaders, but the high central ridge tends to divide the seed stream quite distinctly into two rows which are seeded heavily with very little product deposited towards the central region of the furrow. The outlet is also shielded by a seed boot positioned close to the spreader. Forward deflection of seed is limited as a result. This planting pattern is not desired. No adjustment to the spreader position is possible.

The formation rows of seed or fertilizer reduces the amount of product which can be applied. Seed does not benefit from over crowding, and fertilizer and other products may accumulate in unwanted concentrations which may cause damage.

Rather than planting in two separate rows, a more even scatter pattern is desired for fuller utilization of the soil. It is desired to provide a spreader which provides even scattering of seed delivery without forming distinct rows. If even application of seed and fertilizer can be assured, greater quantities of product can be applied to obtain more efficient soil usage without crowding or burning seed. It is also desired to be able to vary the width of the seed applied to match the furrow. Factors such as air flow, and ground conditions vary the effect of the spread width caused by spreaders. An adjustable spreader would allow seeding to be adapted to the specific conditions to match the spread to the furrow. It is further desired to achieve this delivery without causing shock and seed damage.

SUMMARY OF THE INVENTION

Accordingly, the present invention provides a spreader for mounting on a delivery tube having an outlet through which a stream of product is discharged, said spreader comprising:
 a deflecting surface;
 mounting means for mounting the deflecting surface adjacent the outlet of the delivery tube; and
 adjustment means for selectively adjusting the position of the deflecting surface relative to the product stream.

In a preferred embodiment of the present invention, the adjustment means provides angular adjustment within a range from parallel to the product stream to a substantially horizontal position.

In a further preferred embodiment of the present invention the deflecting surface of the spreader has a tapered shape narrowest at the forwardmost tip of the leading edge.

A still further preferred embodiment includes deflecting surface having lateral portions angled laterally downward from a higher centerline.

A further embodiment of the present invention comprises a spreader for use with a delivery tube on a planting tool, said delivery tube having an outlet through which a stream of product is discharged, said spreader comprising:
 a deflecting surface having a forwardly facing leading edge; and,
 mounting means for securing the deflecting surface at a position below the product stream, spaced a distance in the direction of travel of the product stream from the delivery tube outlet, at an angle to the product stream of less than 65 degrees, wherein the deflecting surface is not angled above a substantially horizontal position for deflecting the stream of product laterally and forwardly.

A preferred embodiment of the present invention comprises a spreader for use with a delivery tube on a planting tool having an outlet through which a stream of product is discharged comprising:

a deflecting surface having a forwardly facing leading edge and a tapered shape narrowest at a forwardmost tip, and lateral portions of the deflecting surface comprising laterally angled planar surface which intersect at an angle of approximately 90 degrees at a centerline;

mounting means for securing the deflecting surface to the delivery tube at a position below the product stream, spaced a distance in the direction of travel of the product stream from the delivery tube outlet; and, adjustment means for selectively positioning the centerline of the deflecting surface at an angle to the product stream between a position substantially parallel to the product stream and a substantially horizontal position.

It is an advantage of the present invention that the pattern of product deposit is adjustable to varying widths by adjusting the position of the spreader without changing to a different tool.

It is a further advantage of the present invention that even distribution of product can be achieved over a range of furrow widths.

It is an advantage both to manufacturer and farmer to provide a spreader which replaces several equivalent tools with a single adjustable one reducing manufacture and stocking costs on the production side, and capital costs and changeover time on the consumer side.

Further advantages will be apparent to persons of skill in the art with reference to the description of preferred embodiments together with the following drawings by way of example only.

BRIEF DESCRIPTION OF THE FIGURES

FIG. 1 is an isometric view of a preferred embodiment of the spreader mounted on a delivery tube, with a portion of the sweep cut away for illustration;

FIG. 1A(1) shows a section along the line A—A illustrating the profile of the spreader tip of FIG. 1;

FIG. 1A(2) shows an alternate profile for the spreader tip of FIG. 1;

FIG. 2 shows the embodiment of FIG. 1 with the spreader positioned at a minimal angle position;

FIG. 2A is a side view of the configuration of FIG. 2;

FIG. 3 shows the embodiment of FIG. 1 with the spreader positioned at its maximum angle position; and FIG. 3A is a side view of the configuration of FIG. 3.

Like numerals are used throughout to indicate like elements.

DETAILED DESCRIPTION OF PREFERRED EMBODIMENTS

A spreader according to the present invention is shown generally at 10 in FIG. 1. The spreader 10 is mounted to a delivery tube 20 of a seed delivery tool (not shown). A delivery tube 20 is a fixture, which receives the flexible seed delivery conduit of the seed delivery tool at an upper end, and discharges seed or other product, from an outlet 26 at a ground engaging end. At the outlet 26, movement the product is no longer constrained in a lateral direction. The tube 20 is curved to mount to a shank which carries the ground opening tool at a standard mounting angle, and in operational position, has a rear interior surface 22 and a front interior surface 24. Seed traveling through the tube tends to travel against the rear interior surface 22 of the tube 20 as a result of this angle. The angle at which the product stream is discharged from the outlet 26 may vary widely depending on the planting tool used. The product stream as depicted in the present embodiment has an angle of 65 degrees to the horizontal. Other tools may discharge the product stream at as low an angle as 20 degrees to the horizontal. Adjacent the outlet 26 is a mounting hole 28 for securing the delivery tube 20 to the shank and sweep 30 (shown cut away from the outlet area for clarity) in front of the delivery outlet 26. The sweep 30 illustrated is exemplary only, various ground opening tools as available in the art may be used. The advantages of even product spread, however, are most effective with tools which create an effectively flat bottom furrow. Fertilizer may be delivered with the seed, and scattered likewise, thus simplifying the equipment requirements for planting.

The spreader 10 includes a channel 12 for stable connection to the delivery tube 20. The channel 12 is pivotally mounted adjacent the outlet 26 of the delivery tube 20 on pins 14. Adjustment of the angle and position is selected by securing holes 16 and strap 18 secured by bolts to the holes 16 and around the tube 20. In this arrangement adjustment can be made without tools using a cotter pin to secure the bolt through holes 16. A sliding slot could replace the holes 16 for finer angular control. An alternative location for the pivot or a sliding adjustment may also be used. Other adjustment means such as a ratcheted snap fit, threaded rod, or other adjustment fittings as known in the art can be used to adjust the angle and position of the deflecting surface 40 on the spreader 10 adjacent the outlet 26. Adjusting the angle and position of the spreader 10 relative to the direction of the discharging product stream controls the amount of deflection by controlling the angle at which the product strikes the deflecting surface 40, and how broad a section of the surface 40 is placed in the product stream, and consequently the width of the product broadcast. The angle to the product stream in the present invention may be as much as 65 degrees, a preferred range is 15 to 30 degrees. A pattern of seeding ranging from no deflection effect up to approximately 10 inches wide has been observed.

The deflecting surface 40 is located below the product stream, in preferred embodiments, oriented at a small angle, as compared to prior art devices, to the product stream to minimize seed damage. The deflecting surface 40 has a leading edge 47 forwardly facing to the direction of travel. This has the advantage of placing seed and other product in the furrow closely following the sweep 30, before the soil begins to fall back into the furrow. A later seed deposit would result in uneven seeding depth, as product may be placed between the bottom of the furrow and the top surface depending on the time delay, ground conditions, and other factors.

The deflection angle is selected to deflect the product forwardly and laterally. The deflecting surface 40 may be adjusted from essentially parallel to the product stream to a substantially horizontal position. Beyond a horizontal position the seed and other material starts to become divided into separate streams, and less material is deflected forwardly. The range of deflection angles is thus dependent on the initial angle of the product stream as the deflecting surface 40 is not raised to an angle beyond a horizontal position. Consequently, a product stream travelling at a lower angle will be compatible with a more limited range of deflection angles. An angle significantly beyond about 65 degrees is expected to cause unacceptable seed damage as seen in prior art devices.

Deflecting surface 40 preferably includes a separation portion 42 for separating a spreading surface 44 from the outlet 26. Deflecting angles relative to the product stream referred to are measured from the spreading surface 44. The separating portion 42 is generally not contacted by the discharging product, except at higher angles of deflection, as it lies in a path nearly parallel to the product stream. It is desired to separate the spreading surface 44 from the outlet 26 in the direction of the product stream enough to permit product deflected by the surface 44 to be deflected laterally without being confined by the walls of the delivery tube 20 for maximum spread. The outlet 26 itself may be configured to form a separating portion 42, with a shape so that the side walls cease to constrain the product before the spreading surface 44 provides a substantially transverse component to the velocity of the product. In this open area the pressure of the air stream is reduced and accordingly the velocity of the product is also reduced producing a more controlled material placement. Unlike prior art spreaders, it is desired to maintain the outlet 26 as open and unobstructed as possible. Interfering objects which can degrade the spreader 10 performance are minimized. Preferably the rear portion of the spreading surface 44 is approximately the width of the delivery tube 20 to catch nearly all of the discharged product. The spreading surface 44 has a tapered shape, preferably to a fine tip at the forwardmost position on the leading edge 47. In a preferred tapered shape the leading edges 47 meet at the tip at approximately 36 degrees, and may be between approximately 25 and 45 degrees. A curved shape rather than triangular as depicted may be equally effective. The spreading surface 44 joins the rear portion 42 at an angle disposing the spreading tip 44 into the discharging product stream at the preferred minimum angle.

The position of the deflecting surface 40 at a given deflecting angle can also be advanced into or withdrawn from the product stream to adjust the width of deflection, particularly with a tapered spreading surface 44 without further adjustment of the deflection angle. If the product stream strikes the narrow tip portion of the spreading surface 44 only a small percentage of the product stream will be deflected while the remaining product passes without deflection. If the deflecting surface 40 is advanced farther into the product stream, product will strike a broader area of the deflecting surface 44 and more of the product stream will be deflected. It is preferred that the widest portion of the deflecting surface 44 be at least as wide as the delivery tube 20, in order to deflect substantially all of the product stream. A sliding mechanism to selectively advance the deflecting surface at a fixed angle into the product stream would also be an appropriate adjustment means.

The deflecting surface 40 can be mounted at a fixed angle to the product stream selected to match the width of the furrow opener used, or selected for maximum scatter pattern. A fixed angle spreader may be formed with or attached directly to the delivery tube. The adjustable mounting may be used to change the width of furrow seeded, or to adjust the seeding pattern as a fine tuning to match furrow widths for specific conditions.

Preferably, the spreading tip 44 of the deflecting surface 40 has a generally convex profile as seen in FIGS. 1A(1) and 1A(2). The surface is angled laterally from a central line 45, seen in FIG. 1A(1). Lateral portions of the spreading surface 44 comprise substantially planar surfaces which intersect at the centerline 45 at an angle of 60–140 degrees. As seen in FIG. 1A(2) the profile may be a rounded convex surface also highest at the center line 45', or a combination of angled surfaces and curved intersection areas forming a generally convex shape. A symmetrical shape provides a regular scatter pattern. The profile may be altered to change the scatter pattern. The compound angle of the spreading surface 44 both forwardly and laterally varies the effective deflecting angle depending on where on the profile a seed strikes, thus increasing the spread of the scatter. Deflection angles, as discussed herein, are measured from the centerline 45 in this preferred embodiment.

The shape of the spreading tip 44 assists in creating an even scatter pattern of seed, fertilizer or other dry material. Combining the adjustable broadcast width from the position adjustment with the preferred features of deflection surface 40 results in an even distribution of product over a wide range of furrow sizes. As a result, fertilizer can be applied with the present invention at increased rates without risk of forming high concentration areas which might cause damage to seeds or immature plants. Increasing the distribution of seed and fertilizer over a wider area achieves greater seed bed utilization than planting in separate rows.

In operation, as illustrated in FIG. 2 when the deflecting surface 40 is set at a minimal angle, essentially parallel to the direction of the product stream, the narrowest scatter pattern is achieved, shown at arrows B—B. The discharging stream travels on the rear interior surface 22, passes over the rear portion 42 of the deflecting surface 40 and is deflected by the angled spreading tip portion 44. A fairly even pattern of material is deflected laterally along the edges of the tapered tip 44 assisted by the angled profile. Seed which leaves the spreading portion 44 of the deflecting surface 40 at the widest point is positioned in the furrow furthest from the centerline 45 of the spreader. Seed which leaves the deflecting surface from the narrower portions or from the tip are positioned in the furrow closer to the centerline 45 of the spreader 10.

In a preferred embodiment the minimum angle will remove the spreading portion 44 of the deflecting surface 40 from the product stream completely, so that a no deflection effect may be set without removing the spreaders 10.

The angle of deflecting surface 40 is seen in FIG. 2A marked by extending rays α—α. No deflection or 0 angle is at the position parallel to the rear interior surface 22 of the delivery tube at the outlet 26 against which the seed is generally travelling. This angle varies depending on the planting tool used and may be 65 degrees, as illustrated in the present embodiment, or as little as 20 degrees. As the spreader 10 is angled for more deflection the angle of the spreading surface 44 into the product stream becomes higher, up to about 65 degrees which is a substantially horizontal position. For a tool having a lower angle of product stream, the range of deflection angles will also be less, from substantially parallel to the product stream up to a substantially horizontal position. It is not desired to deflect product rearwardly, so a deflection angle will not exceed a substantially horizontal position. Preferably the spreading surface 44 is adjusted between 15 and 30 degrees to the direction of a product stream travelling at 65 degrees to the horizontal.

Shown in FIG. 3, the spreader 10 is positioned at its maximum angle to the discharging product stream, with the strap 18 bolted to the highest securing point 16. The deflecting surface 40 is positioned at an angle to the product stream, with the spreading tip portion 44 at a higher angle into the product stream causing the product to leave the tip 44 earlier than seen in FIG. 2. A resulting wider broadcast pattern is seen between arrows C—C. The location of pivot pins 14 results in the position of the spreading surface 44 being advanced into the product stream in addition to increasing the angle. Due to the tapered shape a broader portion of the spreading surface 44 is placed in the product stream. This effect could also be achieved by a sliding mechanism, without angular adjustment, to advance the position of the spreading surface 44 into the product stream.

Figure 3:
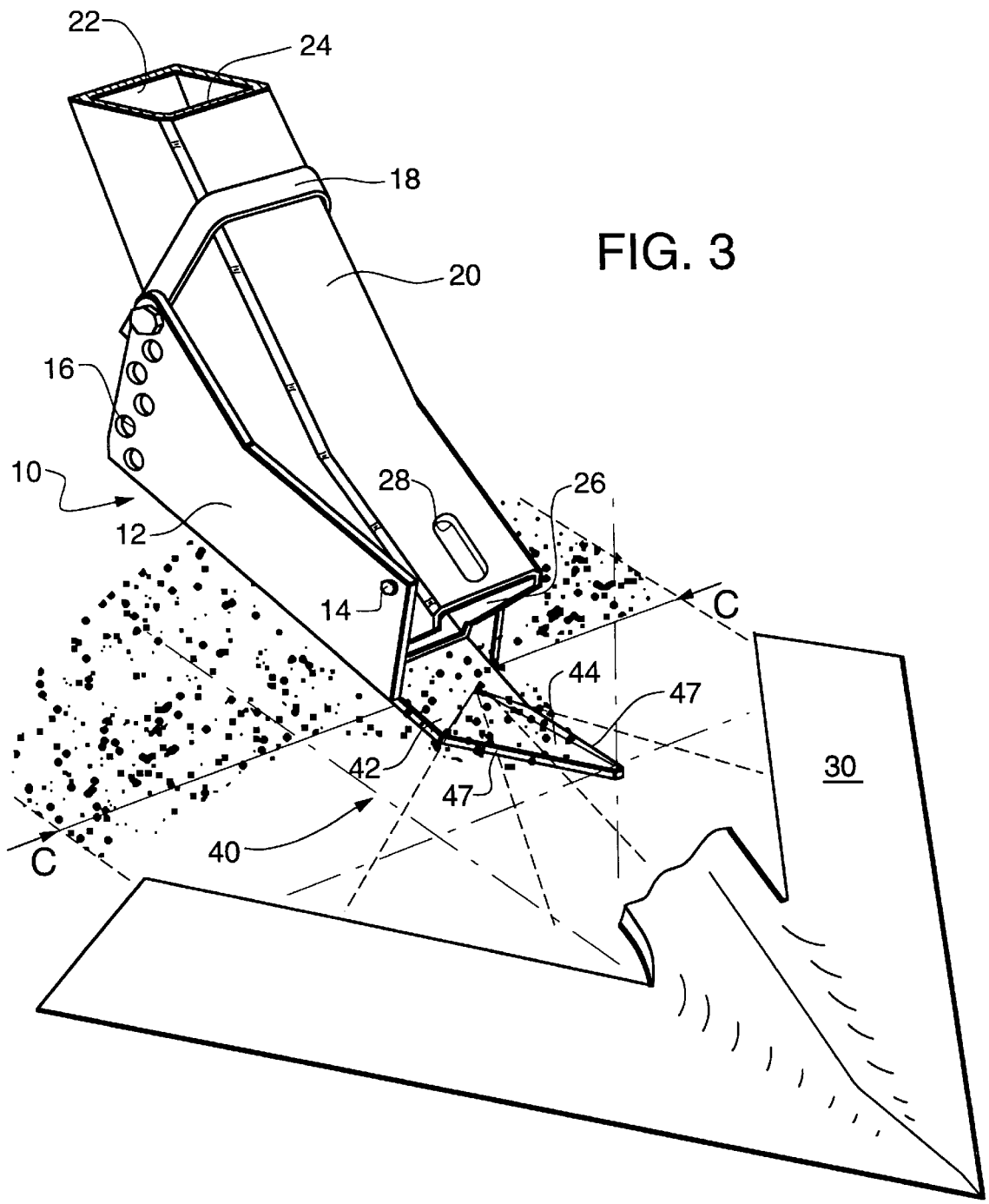

The angle of deflecting surface 40 shown in FIG. 3A depicts a preferred maximum angle β—β to the product stream of 30 degrees to a product stream at 65 degrees. These angles are selected to achieve maximum spreading as gently as possible to avoid shock and shattering of the seed.

In an alternative embodiment of the present invention, the deflecting surface may be positioned above the product stream still including a forwardly facing leading edge to deflect product forwardly and laterally in a downward direction. An angular position of the deflecting surface to the product stream adjustable from essentially parallel to the product stream to a nearly vertical position will give the desired variation to the width of the spread pattern. Adjustment, likewise, may encompass advancing a tapered deflecting surface farther into the product stream or withdrawing it.

What is claimed is:

1. A spreader associated with a delivery tube of an agricultural planting mechanism, said delivery tube having an outlet through which a stream of product is discharged for planting into the ground, said spreader comprising:
   a tapered deflecting surface terminating in a forward tip and diverging therefrom rearwardly;
   means for pivotally mounting the deflecting surface adjacent the outlet of the delivery tube; and
   adjustment means for selectively positionally adjusting the deflecting surface relative to the product stream, said tapered tip being movable into said product stream throughout a range of movement between a retracted position in which said tapered tip is withdrawn from said product stream and a fully inserted position in which substantially the entire deflecting surface is engaged with said product stream to effect a maximum lateral deflection of the product relative to the stream.

2. The spreader of claim 1 wherein the adjustment means provides angular adjustment of said deflecting surface within said range of movement such that the orientation of said tapered tip in said retracted position is substantially parallel to the product stream and the orientation of said tapered tip in said fully inserted position is substantially horizontal.

3. The spreader of claim 2 wherein said adjustment means includes a latching mechanism cooperable with said means for pivotal mounting of said deflecting surface.

4. The spreader of claim 2, wherein the deflecting surface includes a convex profile to the product stream.

5. The spreader of claim 4, wherein the deflecting surface includes at least one lateral portion angled laterally downward.

6. The spreader of claim 1 wherein the deflecting surface has a rearward base portion having a lateral width substantially as wide as said product stream.

7. The spreader of claim 6 wherein said delivery tube outlet has a lateral width, the base portion of said deflecting surface being substantially as wide as the delivery tube outlet.

8. The spreader of claim 6, wherein the deflecting surface includes a convex profile to the product stream.

9. The spreader of claim 8, wherein the deflecting surface includes at least one lateral portion angled laterally downward.

10. The spreader of claim 9 wherein the deflecting surface has opposing, generally planar lateral portions which intersect at an angle of 60 to 140 degrees at a centerline.

11. The spreader of claim 10, wherein the lateral portions comprise substantially planar surfaces which intersect at an angle of approximately 90 degrees at the centerline.

12. A spreader for use with a delivery tube on a sowing implement, said delivery tube having an outlet terminating in an outlet opening having a width through which a stream of product is discharged, said spreader comprising:
    a deflecting member having a separation portion positioned tangentially to said outlet opening and extending generally in the direction of said discharged stream of product and a spreading portion spaced from said outlet opening by said separating portion to engage said discharged stream of product for deflection thereof laterally and forwardly; and
    means for pivotally connecting said deflecting member to said delivery tube to permit the orientation of said deflecting member to be varied relative to said outlet opening, said means for pivotally connecting including adjustment means for securing the pivoted position of said deflecting member at a desired orientation.

13. The spreader of claim 12 wherein said deflecting member is movable relative to the discharged stream of product between a retracted position in which the spreading portion of said deflecting member is withdrawn from said discharged stream of product and a fully inserted position in which substantially the entire spreading portion of said deflecting member is engaged with said product stream to effect a maximum lateral deflection of the product relative to the stream.

14. The spreader of claim 13 wherein the spreading portion of said deflecting member has a tapered shape narrowest at a forwardmost tip thereof.

15. The spreader of claim 14 wherein said spreading portion joins said separation portion at its widest point, which is substantially equal to the width of the delivery tube outlet.

16. The spreader of claim 14 wherein the spreading portion includes a convex profile to the product stream.

17. The spreader of claim 16 wherein the spreading portion includes at least one lateral portion angled laterally downward.

18. In an agricultural planting implement having means for creating a furrow in the ground as said implement is moved in a forward direction during operation; a material delivery tube supported behind the means for creating a furrow to deliver a stream of material along a flow path into the ground within said furrow; and a material spreader positioned to engage said stream of material to distribute said material across said furrow, the improvement comprising:
    said material spreader including a separation portion located adjacent said material delivery tube and a spreading portion extending forwardly from said separation portion when in a first orientation;
    said material spreader being pivotally mounted on said material delivery tube such that the orientation of said material spreader relative to said material delivery tube can be varied angularly, said material spreader being pivotally movable between said first orientation in which said spreading portion is substantially parallel to the flow path of said stream of material and a second orientation in which said spreading portion is substantially perpendicular to the flow path of said stream of material; and an adjustment mechanism for securing a selected orientation of said material spreader relative to said material delivery tube.

19. The planting implement of claim 18 wherein said spreading portion is triangularly-shaped with a forwardmost tip being the apex thereof.

20. The planting implement of claim 19 wherein said spreading portion is retracted from said stream of material when in said first orientation and fully inserted into said stream of material when in said second orientation.

21. The planting implement of claim 20 wherein said adjustment mechanism is operable to secure said material spreader in a plurality of positions between said first and second orientations such that said forwardmost tip can be inserted into said stream of material at an increasingly greater depth from said first orientation toward said second orientation.

22. The planting implement of claim 21 wherein said spreading portion joins said separation portion at a base portion having a greatest width of said material spreader, said greatest width being substantially equal to a width of said stream of material discharged from said material delivery tube.

23. The planting implement of claim 21 wherein said spreading portion has a convex profile presented to said stream of material.

24. A spreader for use with a delivery tube on a sowing machine having an outlet through which a stream of product is discharged comprising:

a deflecting member having a separation portion positioned tangentially to said outlet opening and extending generally in the direction of said discharged stream of product and a spreading portion spaced from said outlet opening by said separating portion, said spreading portion defining a forwardly facing leading edge and a tapered shape narrowest at a forwardmost tip, and lateral portions of said spreading portion having laterally angled planar surfaces which intersect at an angle of approximately 90 degrees at a centerline;

means for pivotally mounting the deflecting member to the delivery tube such that said separating and spreading portions are located at a position below the product stream and the orientation of said deflecting member can be varied relative to said delivery tube outlet and the product stream; and adjustment means for selectively securing the orientation of the centerline of the spreading portion at an angle relative to the product stream between a first orientation substantially parallel to the product stream and a second orientation substantially perpendicular to said product stream.

\* \* \* \* \*